United States Patent [19]

Vierow

[11] 4,164,066
[45] Aug. 14, 1979

[54] FABRICATION OF ANODES BY PLASMA SPRAY DEPOSITION

[75] Inventor: William F. Vierow, West Acton, Mass.

[73] Assignee: P. R. Mallory & Co., Inc., Indianapolis, Ind.

[21] Appl. No.: 582,337

[22] Filed: Jun. 9, 1975

Related U.S. Application Data

[63] Continuation of Ser. No. 381,835, Jul. 23, 1973, abandoned, which is a continuation of Ser. No. 198,306, Nov. 12, 1971, abandoned.

[51] Int. Cl.² ............. H01G 9/00; H01G 9/05; H01G 9/06
[52] U.S. Cl. ............. 29/570; 361/433; 427/34; 427/79; 427/80; 427/123; 427/376 G; 427/376 H; 427/383 A; 427/383 C; 427/423
[58] Field of Search ............. 427/79, 80, 223, 225, 427/34, 123, 376 E, 376 G, 376 H, 383 A, 383 C, 423; 317/230; 361/433; 29/570, 572

[56] References Cited

U.S. PATENT DOCUMENTS

| | | | |
|---|---|---|---|
| 2,104,018 | 1/1938 | Brennan | 317/230 |
| 3,310,423 | 3/1967 | Ingham | 427/223 |
| 3,356,912 | 12/1967 | Rairden | 317/230 |
| 3,378,392 | 4/1968 | Longo | 427/34 |
| 3,512,049 | 5/1970 | Hoberman | 317/230 |
| 3,544,853 | 12/1970 | Giles | 317/230 |
| 3,641,399 | 2/1972 | Klein et al. | 317/230 |
| 3,674,544 | 7/1972 | Frosseau | 427/34 |
| 3,702,770 | 11/1972 | Michael | 427/223 |
| 3,817,782 | 6/1974 | Klein et al. | 427/79 |

*Primary Examiner*—Michael F. Esposito
*Attorney, Agent, or Firm*—Hoffmann, Meyer & Coles

[57] ABSTRACT

A method of forming capacitor anodes is described wherein leads of film forming metal, preferably headed are subjected to plasma spray deposition of film forming metal, preferably at a flame temperature of about 10,000° to 20,000° C. to form capacitor anodes.

7 Claims, 12 Drawing Figures

FABRICATION OF ANODES BY PLASMA SPRAY DEPOSITION

This is a continuation of application Ser. No. 381,835, filed July 23, 1973, now abandoned, which is a continuation of Ser. No. 198,306, filed Nov. 12, 1971, now abandoned.

BACKGROUND

According to prior art techniques, anodes for capacitors are produced by blending of film forming metals powder with a binder, pressing and compacting the powder and binder together, presintering and finally sintering to produce the final anodes. A lead is embedded prior to sintering or welded after sintering to allow electrical connection to a circuit.

However, this technique has a disadvantage of introducing impurities due to the presence of the binder. Also the pressing operation results in lack of uniformity of the resulting anodes. Furthermore, the time required to carry out the blending operation and the pressing and/or compacting increase the cost of the anodes considerably. It is also very difficult to attach tantalum leads to fractional anodes by embedding or welding.

It therefore is an object of the present invention to produce film forming metals anodes quickly and in a reproducible manner.

It is another object of the present invention to produce film forming metal anodes with a minimum amount of contamination of impurities.

It is another object of the present invention to reduce the number of operations required in the production of anodes.

It is another object of the present invention to avoid the embedding or welding operations for attaching leads to the anodes.

Another object of the present invention is to produce film forming metal anodes at low cost.

Other objects will be apparent from the following description and drawings wherein:

THE DRAWINGS

SUMMARY OF THE INVENTION

According to the present invention film forming metal leads, preferably headed, are affixed to a carrier means such as adhesive tape or a film forming metal carrier strip for example by welding, and are spaced several thousands of an inch apart. The carrier means may be placed in a fixture or otherwise passed through plasma spray deposition apparatus. If desired the leads may be surface conditioned including cleaning and/or surface roughening for example by grit blasting or by chemical or electro-chemical etching with or without surface treatment, plasma spray deposition of film forming metal powder is carried out upon the leads. The anodes are then removed from the carrier means, sintered to final form and then are conventionally processed to form capacitors. The anode means of the present invention is capable of performing an electrical function and comprises lead means of a film-forming metal. The lead means includes a headed portion and an elongated portion. The headed portion has a section facing away from the elongated portion in a direction substantially parallel to the central longitudinal axis of the elongated portion. A porous deposit of film-forming metal powder is over the section of the headed portion. The deposit is capable of acting as an anode.

DETAILED DESCRIPTION

While the present invention may be carried out in the production of any film forming metal anodes, including tantalum, aluminum, titanium, or niobium, the preferred material is tantalum and the present description will be directed to tantalum, as an example.

The first step in the process is to provide one or more tantalum leads. The leads are preferably headed. FIGS. 2a-2d illustrate various heading shapes as examples which may be utilized according to the present invention.

Figure 1:
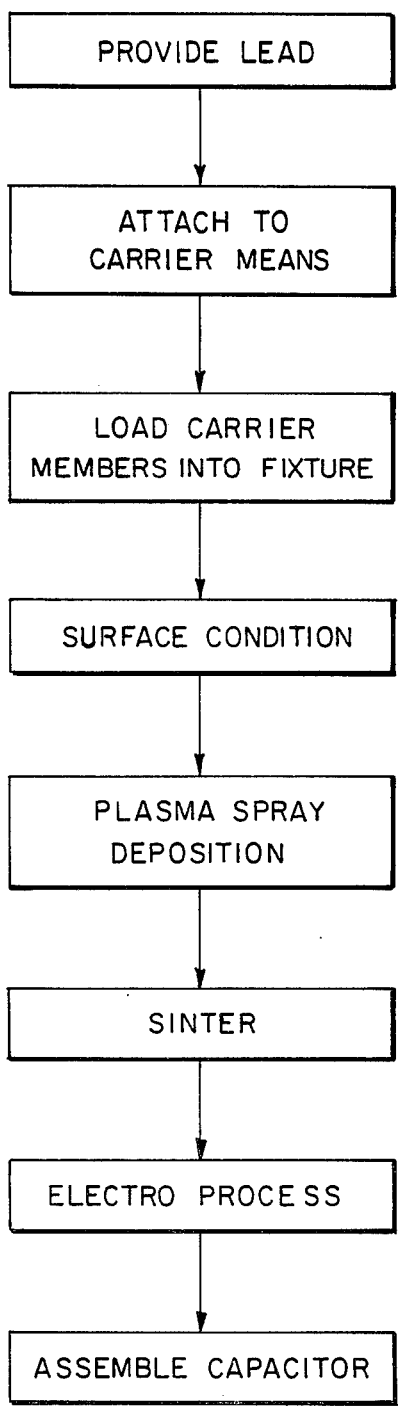
FIG. 1 is a flow sheet illustrating the steps to be utilized in the process of making the anodes according to the present invention.
Figure 2:
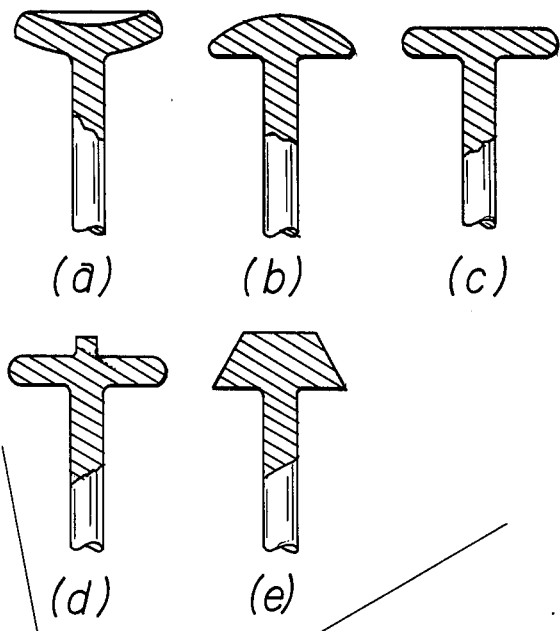
FIGS. 2a, 2b, 2c, 2d and 2e illustrate various head configurations which may be utilized in the anodes of the present invention.
Figure 3:
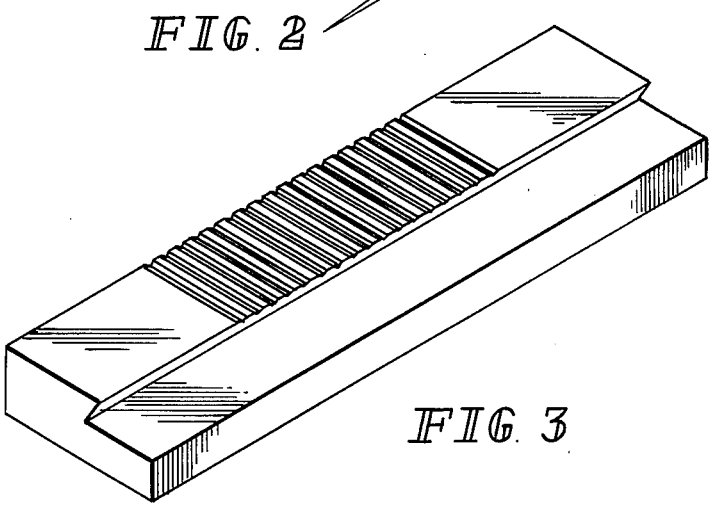
FIG. 3 is a view of the fixture which may be utilized to form strips of film forming metal anodes according to the present invention.

As shown in FIGS. 2a-2d, the lead means 20 include a headed portion 21 and an elongated portion 22. The headed portion 21 has a section 23 facing away from the elongated portion 22 in a direction substantially parallel to the central longitudinal axis 24 of the elongated portion. The section 23 of the headed portion 21 is intended to serve as the target for the deposit (not shown in FIGS. 2a-2d) of film-forming metal. In FIG. 2(a) the section 23 of the headed portion 21 is substantially concaved. In FIG. 2(b) the section 23 of the headed portion 21 is substantially a buttonhead. In FIGS. 2(c) and 2(d) the section 23 of the headed portion 21 is substantially a flathead. In FIG. 2(e) the section 23 of the headed portion 21 is substantially a conehead. Non-headed leads may be used; however they should preferably have a cross-sectional longest-dimension of at least 0.02 inches. Usually this dimension is the diameter. The upper limitation as to the thickness of the leads is the case size; the head and/or cross-section of the lead must be small enough to go into the case. Usually the film forming metal leads are produced by cold heading and cutting off simultaneously. However, obviously this need not necessarily be the case.

The next step in the process is to attach a series of headed leads to a carrier means such as adhesive tape or a carrier strip. Adhesive tape is perhaps simpler and is particularly easily carried out by placing the headed leads in a loading fixture such as the one shown in FIG.

3, which gives the proper spacing for the leads. The adhesive tape is preferably a high temperature polymeric tape which is able to withstand temperatures of up to about 300° C. Examples include nylon and tetrafluoroethylene (teflon). The leads should be at least about 0.020 inches apart to avoid bonding together adjacent leads during spraying and preferably they are at least 0.030 inches apart. Similar space limitations apply to attaching the leads to other carrier members, such as a carrier strip.

It should also be emphasized that a continuous method of placing the leads in a fixture can be utilized; for example a vibratory feed may be utilized which places the leads in the fixture automatically. Automatic operation would obviously be the preferred way of carrying out this step under commercial production conditions.

Figure 4A:
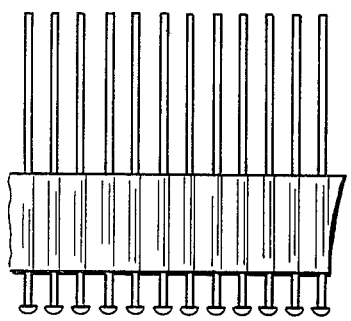
FIG. 4(a) is a view of the anodes of the present invention after adhesive tape strips are utilized to hold them together.
Figure 4B:
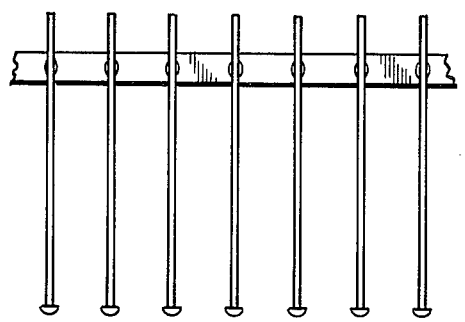
FIG. 4(b) is a view of the leads welded to a carrier strip.

FIGS. 4(a) and 4(b) illustrate respectively tantalum leads mounted on polymeric adhesive tape and on a tantalum strip.

Figure 5A:
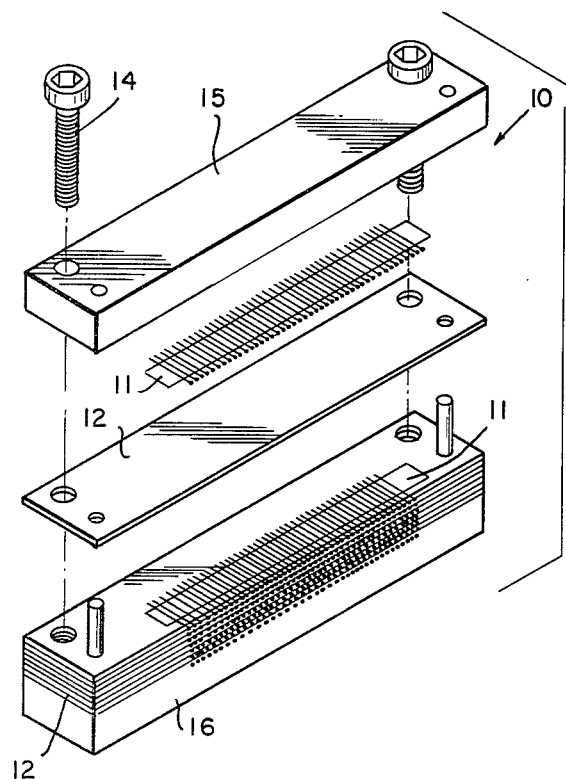
FIG. 5(a) is a view of the fixture to be utilized for anode spraying and the grit blasting according to the present invention.
Figure 5B:
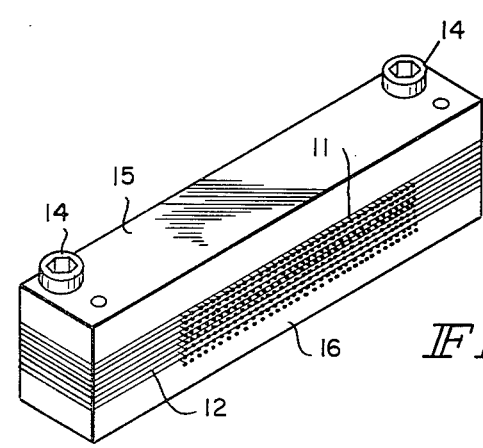
FIG. 5(b) is a view of the fixture as assembled.

The next step in the process is an optional one. As can be seen from FIG. 5 of the drawings a fixture 10 may be utilized wherein several of the carrier members with leads attached are placed in the fixture. For example, the fixture may comprise plates 12 upon which the carrier members 11 are alternately placed. Dowl pins 13 serve as a guide and screws 14 hold the fixture together within blocks 15 and 16. FIG. 5a shows the assembled fixture. Other fixture designs will be apparent to those skilled in the art.

The next step is also an optional one and it involves surface conditioning the leads prior to spray deposition. This may involve removal of organic or inorganic surface contaminates and/or surface impurities such as those arising from the heading operation and/or handling. The removal may be done by various techniques including chemical cleaning, sintering the leads in an inert or vacuum atmosphere and/or surface roughening the leads. Conventional organic or inorganic metal cleaning agents may be used.

The surface roughening can be done for example by grit blasting, by chemical etchings, or by electro chemical etching.

The grit blasting operating may involve sand blasting, blasting with alumina, or with metal silicate particles. For example, the mesh size may be from about −50 to −150.

If electro-chemical etching is utilized to achieve surface roughness electro chemical etching at two to twenty volts and 5 to 100 milliamperes current per centimeter in etching mediums of halide acids and salts may be used. For example, a 3% ammonium-bromide in a methonal solvent a voltage of two to ten volts and a current of 10 to 50 milliamperes is effective. Alternatively ordinary chemical etching may be utilized for example by immersing the leads in a solution of 10 wt.% HF and 90 wt.% of $H_2SO_4$.

Such cleaning and/or surface roughening may or may not be desirable depending upon the cleanliness of the leads and the properties desired in the resulting capacitor. For instance, it has been found that to produce anodes having a capacitance of from about 0.002 microfarads up to about 0.06 microfarads at 50 volts, surface roughening is usually not required. Obviously these particular limits are not critical; however, for higher capacitance ratings of from about 0.060 microfarads up to about 1.0 mfd surface roughening is preferred.

While the surface conditioning may take place before or after placing the leads in a fixture, it is usually preferred to carry out the surface conditioning after the leads are assembled into a fixture for ease and economy of handling.

Also, it should be recognized that the anode strips may be continuously circulated in front of the spray apparatus in which case the fixture would not be needed.

In any event, either by means of a fixture or continuous strip or belt or otherwise, means must be provided to move the strips with respect to the spray deposition apparatus or vice-versa because the leads usually can not withstand the heat of the spray deposition apparatus continuously for the time required to achieve sufficient deposition to give the capacitance ratings desired.

Considerable information is available concerning the plasma spray deposition process. For example, a good discussion is found in the FLAME SPRAY HANDBOOK 1st Edition, published by Metco, Inc. (vol.3) particularly pages 5–24, which are hereby incorporated into the present application by reference.

Figure 6:
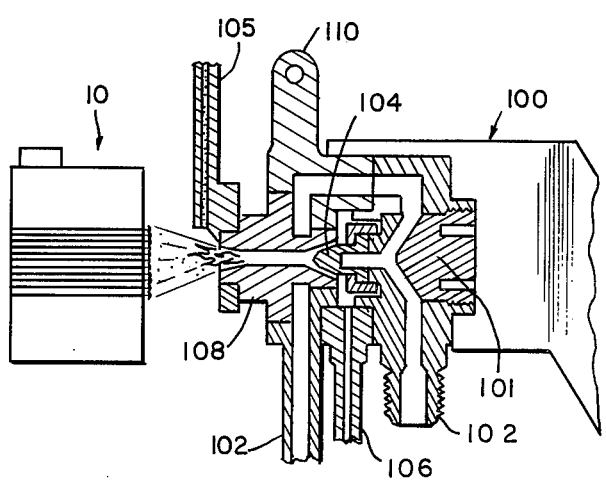
FIG. 6 is a cross-sectional view of the plasma spray deposition apparatus to be utilized in accordance with the present invention.

To summarize, as can be seen from FIG. 6 the spray apparatus 100 comprises a mounting fixture 110 and an electrode holder 101 through which is circulating a fluid, usually water through the channel 102. An electrode or cathode 104 is used to strike an arc between the cathode nozzle 108 which is of opposite polarity. The film forming metal powder is fed into the plasma flame with a carrier gas such as argon through feed channel 105. Simultaneously plasma gas such as hydrogen is fed into the channel 106 and forms the plasma spray, as described in greater detail in the said FLAME SPRAY HANDBOOK.

Anodes to be sprayed are moved into and out of the plasma spray during the spray deposition operation, for example carried by fixture 10.

The flame spray apparatus should be operated to maintain a flame temperature of about 10,000° to 20,000° F. Preferably a temperature of 16,000° to 18,000° F. is utilized. The film forming metal powder should be of a size from 1–100 microns, preferably 2–50 microns. A vibratory feed mechanism (not shown) with an inert gas such as argon or helium is preferably utilized.

The anodes to be deposited can not remain in the flame spray for too long a time or they will heat up and oxidize unduly. Various techniques can be utilized to separate the anodes being sprayed from the plasma spray from time to time without turning the plasma spray apparatus off. A shield or blast gate may be passed between the two. Alternatively the anodes to be sprayed may be circulated in and out of the flame spray area continuously until the deposit has sufficiently built up.

Figure 7:
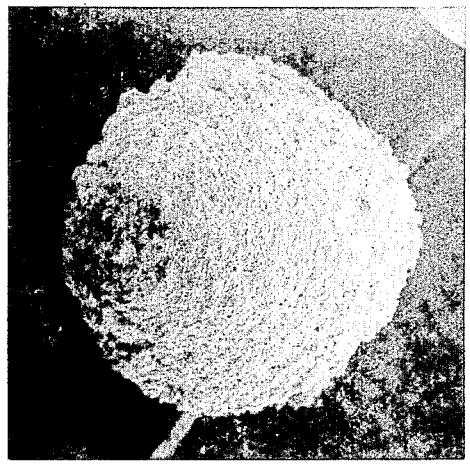
FIG. 7 is an enlarged view of one of the leads.
Figure 8:
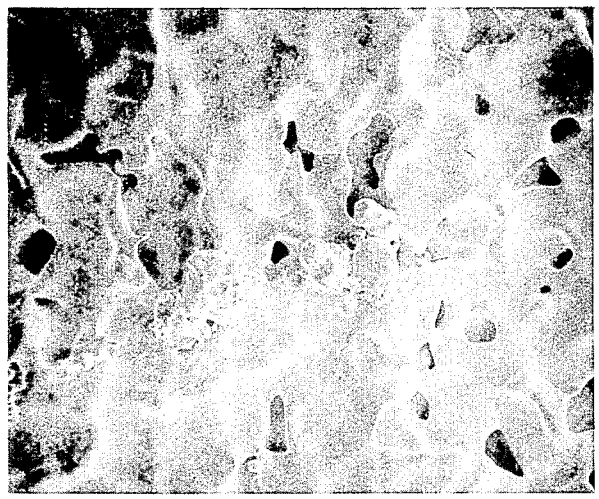
FIG. 8 is a view of the microstructure of the spray deposited film forming metal at 1,000 magnifications.
Figure 9:
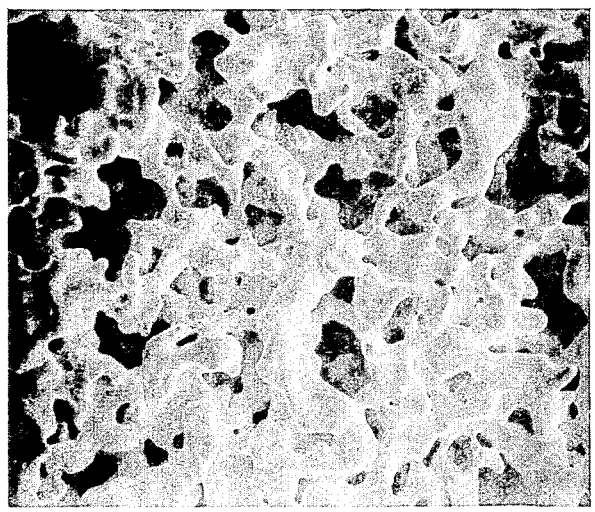
FIG. 9 is a comparative view of the microstructure of prior art anodes at 1,000 magnifications.

FIG. 7 is an enlarged view illustrating the microstructure of the plasma deposited lead ends. FIG. 8 is a 1000× electron scan photomicrograph. It will be apparent that the micro structure consists of a laminar, porous, uniform muliplicity of flat, interlocking, leaflike deposits with relatively little void space. The void volumne percent is generally about 50% percent in the devices of the present invention. This is to be compared with the structure shown in FIG. 9 wherein considerable void volume can be seen, in the comparative material of the prior art, also at 1000×. The void volume is always at least 60% and is generally at least 70% in the prior art comparative material, a porous three dimensional skeletal structure of bonded irregular shaped anodes of tantalum powder.

Usually the amount of deposition per pass is about 0.05 to 2 grams per pass preferably about 0.75 to 1.5 grams per pass. The number of passes required to obtain a given capacitor and/or CV product rating can readily be determined empirically by trial and error. For example the following table shows the number of passes regained to achieve various capacitors and CV products values for 50 volt capacitors.

TABLE I

FINISHED CAPACITANCE OF 50 VOLT ANODES
VS
REQUIRED NUMBER OF SPRAY PASSES

| Capacitance (Nanofarads) | CV Product (MFD/V) | Required Number of Spray Passes | Required Spray Time for Anodes (sec.) |
| --- | --- | --- | --- |
| 2.4–3.0 | .5–.6 | 2 | 1–2 |
| 3.3–4.1 | .7–.8 | 4 | 3–4 |
| 4.2–5.2 | .g–1.1 | 8 | 6–7 |
| 6.1–7.5 | 1.25–1.4 | 12 | 9–10 |
| 7.3–9.1 | 1.5–1.75 | 14 | 11–12 |
| 8.5–11.5 | 1.8–2.2 | 16 | 12.5–13.5 |
| 10.5–13.5 | 2.2–2.6 | 20 | 15–17 |

Figure 10:
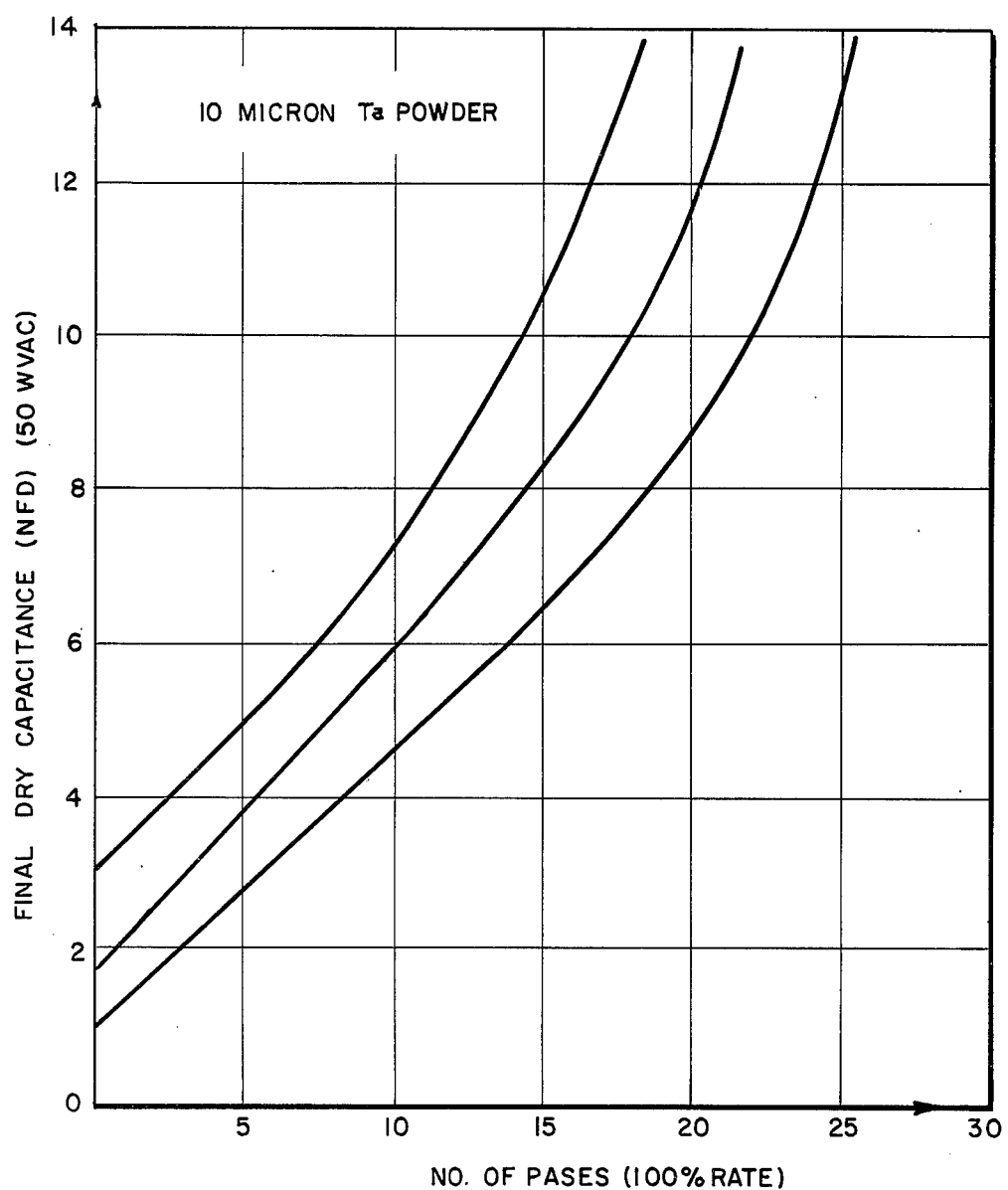
FIG. 10 is a plot of number of passes during deposition versus the capacitance of capacitors obtained.

The capacitance data in Table I is shown graphically in FIG. 10. Similar Tables can easily be obtained for other voltage ratings.

After spray deposition the anodes are removed from the carrier and then are sintered, for example at 1800° to 2200° C. for a time of 10 to 30 minutes to insure a sound bond.

After the sintering operation, the anodes are subjected to conventional processing to form capacitor devices. Usually a dielectric oxide is formed thereon and then if a solid capacitor is desired an electrolyte forming solution such as manganese nitrate is used to form the manganese dioxide layer in a known manner. However, the anodes may be also utilized with a sulfuric acid electrolyte.

In the production of solid capacitors, it is important to control the extent of manganese dioxide deposition on the lead and in order to control this, heat resistant, polymeric jackets can be utilized which withstand the manganese nitrate conversion temperature of about 250° C. or higher to help protect the anodes from conversion in the undesired areas.

For example, 0.0037 microfarad 50 volt DC anodes through about 0.1 microfarad 50 DC volt anodes have been successfully produced. Furthermore, the DC leakage values are low for these devices, usually less than 10.0 nanoamperes.

The process of the present invention is particularly effective in increasing the yield of capacitors. Tests carried out indicate that 100% of the population of the anodes fall within plus or minus 20%, and 75% to 100% of the population falls within plus or minus 10% of the average group capacitance. This is to be compared to the standard method which usually results in roughly 75% being within plus or minus 20% and 50% being within plus or minus 10%.

What is claimed is:

1. A method of making an anode means capable of performing an electrical function including the steps of forming a plasma spray of film-forming metal particles, passing a headed portion of a dielectric film-forming metal means including the headed portion and an elongated portion thru the spray of dielectric film-forming metal particles, the headed portion including a section facing away from the elongated portion in a direction substantially parallel to the central longitudinal axis of the elongated portion, depositing sprayed film-forming metal particles over the section of the headed portion of the film-forming metal means, and sintering the film-forming metal means and the deposit to help bond the film-forming metal means and the deposit, the sintered deposit being porous and capable of acting as an anode means.

2. The method of claim 1, wherein the porous deposit of film-forming metal over the section of the headed portion includes interconnecting voids occupying up to about 50% of the total volume of the deposit.

3. The method of claim 2, wherein the deposit has an interlocking, leaf-like microstructure.

4. The method of claim 3, wherein the spray of film-forming metal particles is composed of particles having a particle size of about 1 to about 100 microns, and wherein the deposit weighs about 0.05 grams to about 30 grams.

5. The method of claim 1, wherein the headed portion is either a conehead configuration, or a buttonhead configuration, or a flathead configuration.

6. The method of claim 1, including the further steps of forming a dielectric means contacting the porous deposit of film-forming metal, contacting the dielectric means with electrolyte means, and contacting the electrolyte means with cathode means to form a capacitor.

7. The method of claim 6, including the further step of, prior to contacting the dielectric means with electrolyte means, providing the anode means except for the deposit with a polymeric jacket to help prevent the electrolyte means from contacting other portions of the anode means.

* * * * *